UNITED STATES PATENT OFFICE.

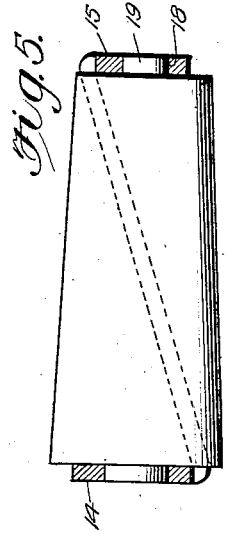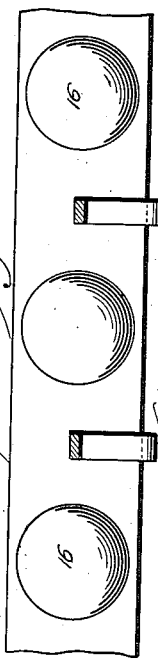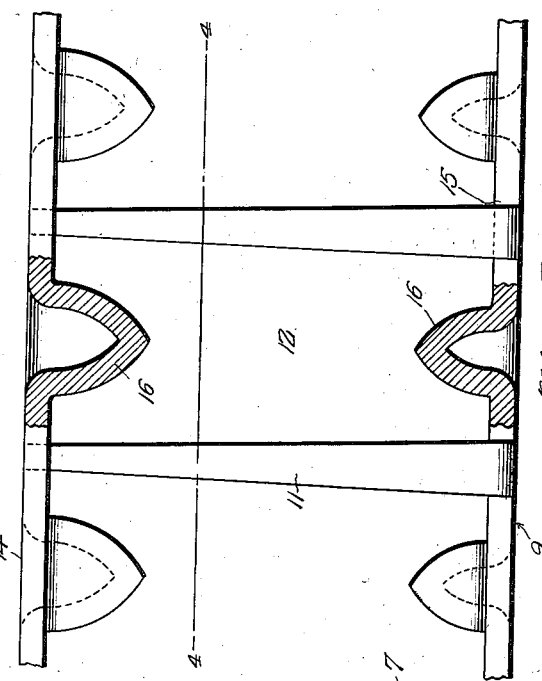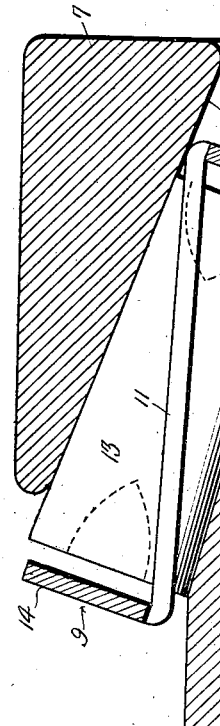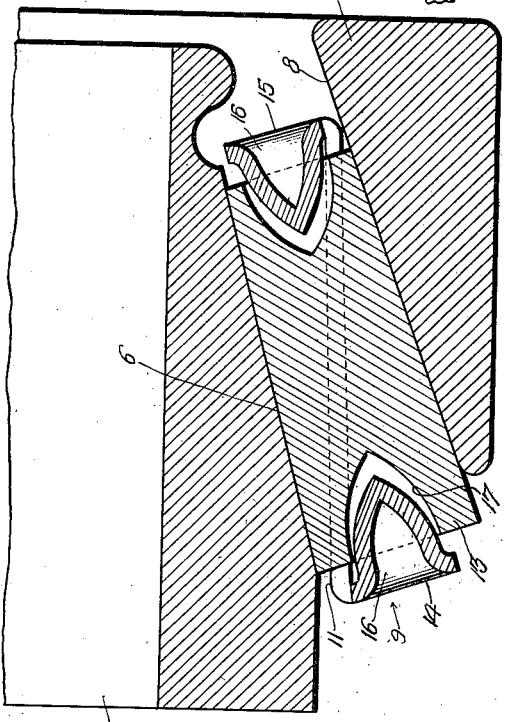

WILLIAM F. HUTHER, OF CANTON, OHIO.

ROLLER BEARING.

1,402,071. Specification of Letters Patent. Patented Jan. 3, 1922.

Application filed March 5, 1920. Serial No. 363,548.

*To all whom it may concern:*

Be it known that I, WILLIAM F. HUTHER, a citizen of the United States, residing at Canton, in the county of Stark and State of Ohio, have invented certain new and useful Improvements in Roller Bearings, of which the following is a specification.

My invention relates to roller bearings.

An important object of the invention is to provide a cage included in the roller bearing, which cage is formed from a single section of sheet or plate metal, and adapted for receiving and holding the rollers or roller elements in the proper assembled condition, and preventing them from being displaced with respect to the longitudinal axis of the bearing, and also from crowding.

A further object of the invention is to provide a cage of the above mentioned character, which is simple in construction, cheap to manufacture, strong and durable.

Other objects and advantages of the invention will be apparent during the course of the following description.

In the accompanying drawings forming a part of this specification, and in which like numerals are employed to designate like parts throughout the same.

Figure 1 is a central longitudinal section through a roller bearing embodying my invention, parts being broken away, Figure 2 is a similar view showing the roller in section, Figure 3 is a plan view of the cage, parts broken away and parts in section, Figure 4 is a longitudinal section taken on line 4—4 of Figure 3, and, Figure 5 is a transverse section through a slightly different form of roller and cage embodying the invention, and corresponding with the position shown in Fig. 1.

In the drawings, wherein for the purpose of illustration are shown preferred embodiments of my invention, the numeral 5 designates an inner bearing member, preferably having an outer tapered surface 6. Surrounding this inner member is an outer bearing member 7, preferably having a tapered or conical inner surface 8, as shown. The surfaces 6 and 8 preferably form a tapered annular passage or space.

The numeral 9 designates my improved cage, as a whole, which may be formed of sheet or plate metal, such as steel. This cage may be a stamping and embodies an annular body portion 11, flat in cross section, and arranged diagonally of the tapered passage. The body portion 11 is provided with equi-distantly spaced openings 12, which are tapered, for receiving tapered rollers 13. It is obvious that any other form of rolling element may be employed. The rollers 13 are confined between the surfaces 6 and 8, to contact therewith.

Formed integral with the opposite edges of the body portion 11 are annular flanges 14 and 15, preferably bent from the material of the same. These flanges extend in opposite directions with relation to the diagonal body portion 11. The flanges 14 and 15 have pivot elements 16, which are preferably hollow and tapered, the same extending inwardly to the pivotally mounted within tapered recesses 17, formed in the ends of the rollers 13. The pivot elements 16 are in the form of trunnions, which are pressed or spun from the material of the flanges 14 and 15, which operation may be performed after the rollers 13 are assembled within the openings 12, if desired.

In Figure 5, the cage 9 has its flanges 14 and 15 provided with openings 18, instead of the trunnions 16. The rollers 13 are provided with trunnions 19, pivoted within the openings 18.

The tapered arrangement of the surfaces 6 and 8 and the tapered rollers 13, serves to take up the end thrust or load, as well as the radial thrust, and provides for an adjustment of the bearing, to take up all slack due to wear. The cage is preferably constructed of sheet steel having a suitable thickness whereby it is rigid.

It is to be understood that the forms of my invention herewith shown and described are to be taken as preferred examples of the same, and that various changes in the shape, size, and arrangement of parts may be resorted to without departing from the spirit of my invention, or the scope of the subjoined claims.

Having thus described my invention, I claim:

A roller bearing including an inner race member having a frusto-conical outer surface unobstructed at its larger end, an outer race member having an inner frusto-conical surface spaced away from the outer surface of the inner member to provide an annular passage tapering longitudinally in one direction, a roller cage located in said passage and having a substantially cylindrical body portion provided with spaced apertures, an inwardly extending frusto-conical flange integral with one end of said body portion, an outwardly extending frusto-conical flange integral with the opposite end of said body portion and arranged substantially parallel to the first mentioned flange, tapered rollers arranged in said passage between said flanges and decreasing in diameter toward the reduced end of the passage, said rollers having recessed ends, and trunnions integral with same flanges and extending into said recesses.

In testimony whereof I affix my signature.

WILLIAM F. HUTHER.